United States Patent [19]

Matsumoto et al.

[11] Patent Number: 4,571,820

[45] Date of Patent: Feb. 25, 1986

[54] DEVICE FOR DISASSEMBLING AND REASSEMBLING A MAIN STEAM ISOLATION VALVE OF A NUCLEAR REACTOR

[75] Inventors: Takayuki Matsumoto, Yokohama; Tadahiko Iwai, Fujisawa, both of Japan

[73] Assignee: Ishikawajima-Harima Jukogyo Kabushiki Kaisha, Japan

[21] Appl. No.: 581,431

[22] Filed: Feb. 17, 1984

[51] Int. Cl.[4] ............................................ B23P 19/00

[52] U.S. Cl. .................................. 29/723; 29/400 N; 29/402.03; 29/426.1; 29/426.3; 376/260; 414/746

[58] Field of Search ............ 29/400 N, 402.03, 426.1, 29/426.3, 723; 165/76; 376/260; 414/746

[56] References Cited

U.S. PATENT DOCUMENTS 3,510,012 5/1970 Van Meteren ..................... 414/746
3,567,044 3/1971 Travis ............................... 414/746
3,836,015 9/1974 Travis ............................... 414/746
3,958,698 5/1976 Van Der Woerd ................ 414/746
4,053,062 10/1977 Travis ............................... 414/746
4,227,854 10/1980 Coffey ............................... 414/746
4,323,398 4/1982 Simon ............................. 414/746 X
4,452,753 6/1984 Wentzell et al. ............... 376/260 X

FOREIGN PATENT DOCUMENTS 163246 9/1983 Japan ................................. 29/426.1

*Primary Examiner*—Mark Rosenbaum
*Assistant Examiner*—Ronald S. Wallace

[57] ABSTRACT

A device for disassembling and reassembling a main steam isolation valve which is extended at an angle from a main steam pipe extended from a nuclear reactor. The disassembly and reassembly of the isolation valve which requires a high degree of accuracy can be accomplished quickly in a simple manner without the need of skilled workers. Thus, the time required for disassembling and reassembling the isolation valve can be shortened.

1 Claim, 7 Drawing Figures

DEVICE FOR DISASSEMBLING AND REASSEMBLING A MAIN STEAM ISOLATION VALVE OF A NUCLEAR REACTOR

BACKGROUND OF THE INVENTION

In nuclear-reactor power stations, high-temperature and high-pressure steam is generated in a reactor and flows to a turbine or the like through a main steam pipe. The main steam pipe is provided with a main steam isolation valve (MSIV) for isolating the flow of steam in case of an emergency. The isolation valve is attached to the main steam pipe at an angle of 45°.

In order to maintain the operability of the main steam isolation valve, it is periodically disassembled and inspected and adjusted. Since the space where the isolation valve is installed is narrow and in order to limit the exposure to radiation as low as possible, a device for disassembling and reassembling the main steam isolation valve has been long desired which is to be so designed and constructed that the disassembly and reassembly of the isolation valve can be accomplished within a short time period and in a simple manner.

So far many workers use chain blocks for disassembling and reassembling the isolation valve. The valve stem must be carefully withdrawn and then inserted again in such a way that the valve stem may be prevented from being bent. Therefore, as shown in FIG. 1, three chains 4*a*, 4*b* and 4*c* extended respectively from chain blocks 2*a*, 2*b* and 2*c* are securely fixed to three points of the isolation valve 1 and the chains 4*a*, 4*b* and 4*c* are pulled or loosened so that the valve stem can be withdrawn or inserted along the axis of the isolation valve 1. According to this method, there arise some problems. Firstly, many skilled labors are needed. Secondly, it takes a long time to adjust the isolation valve. Thirdly, labors tend to be exposed to radiation too much. Furthermore, there is a problem that the valve stem 3 is subjected to bending because the direction in which the valve stem 3 is withdrawn or inserted is not stabilized.

The present invention was therefore made to substantially overcome the above and other problems encountered in the prior art mode for disassembling and reassembling a main steam isolation valve. The primary object of the present invention is to provide a device for disassembling and reassembling a main steam isolation valve which can quickly disassemble and reassemble the main steam isolation valve with a high degree of accuracy without the need of skilled labors, which can accomplish the disassembly and reassembly of the main steam isolation valve in a safe manner and which requires only a minimum installation and working space.

The above and other objects, effects and features of the present invention will become more apparent from the following description of a preferred embodiment thereof taken in conjunction with the accompanying drawings.

DESCRIPTION OF THE PREFERRED EMBODIMENT

Figure 1:
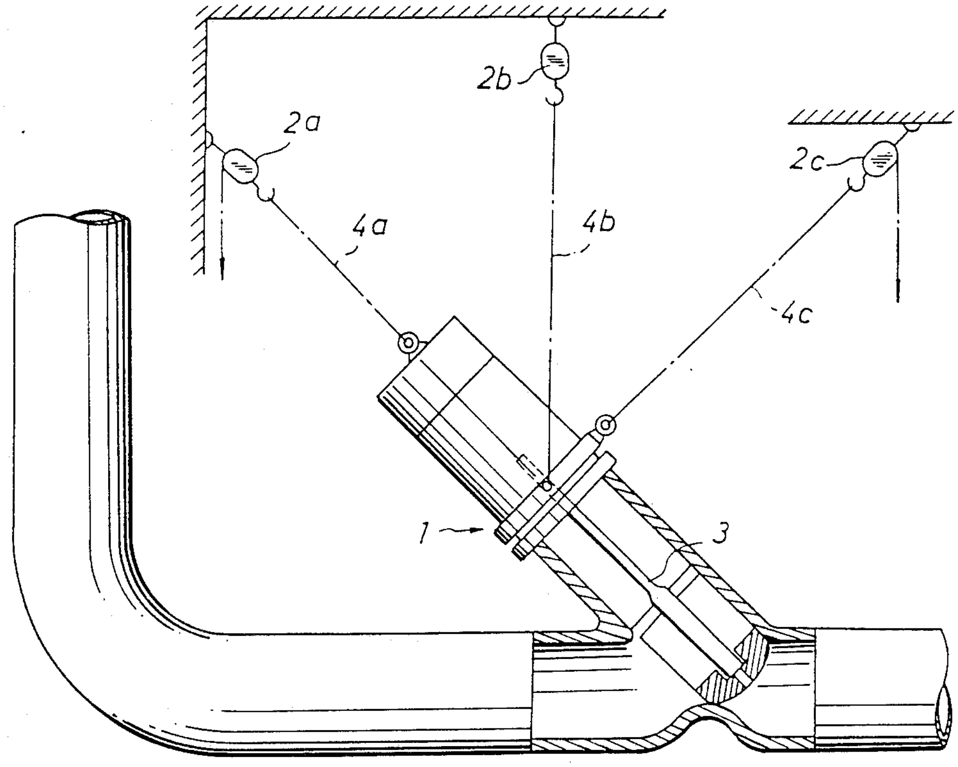
Fig. 1 PRIOR ART
FIG. 1 shows a prior art mode for disassembling and reassembling a main steam isolation valve.
Figure 2:
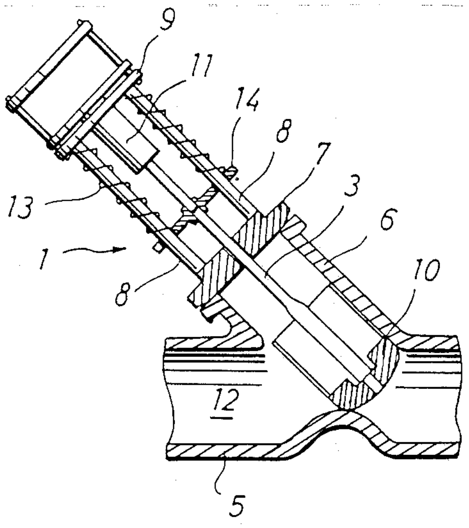
FIG. 2 is a schematic sectional view of a main steam isolation valve.

Referring first to FIG. 2, the construction of a main steam isolation valve will be described. The main steam isolation valve 1 has a flange plate 7 which is removably bolted to the upper end of a branched pipe 6 branched from a main steam pipe 5 at an angle. Four yoke rods 8 are extended from the flange plate 7 and an end plate or top spring sheet 9 is attached to the upper ends of the yoke rods 8. A cylinder 11 for driving a valve body 10 is mounted on the end plate 9. The valve body 10 is slidably fitted into the branched pipe 6 so as to selectively open and close a main steam passage 12 in the main steam pipe 5 and is connected to the cylinder 11 through a stem 3 which is air-tightly extended through the flange plate 7. A bias spring 13 is fitted over each yoke rod 8 between the end plate 9 and a spring retainer 14 formed integral with the valve stem 3 so that in the case of an emergency the valve body 10 is forced to close the main steam passage 12 without the aid of the cylinder 11. In this embodiment, the isolation valve 1 is shown as being installed at an angle with respect to the main steam pipe 5.

Figure 4:
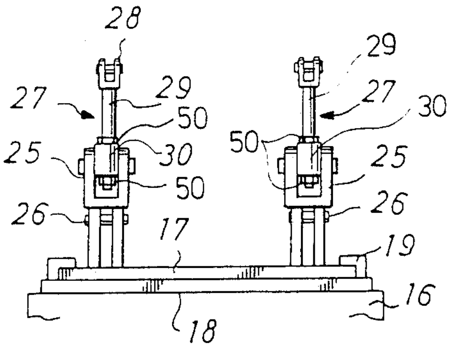
FIG. 4 schematically shows a supporting stand.
Figure 3:
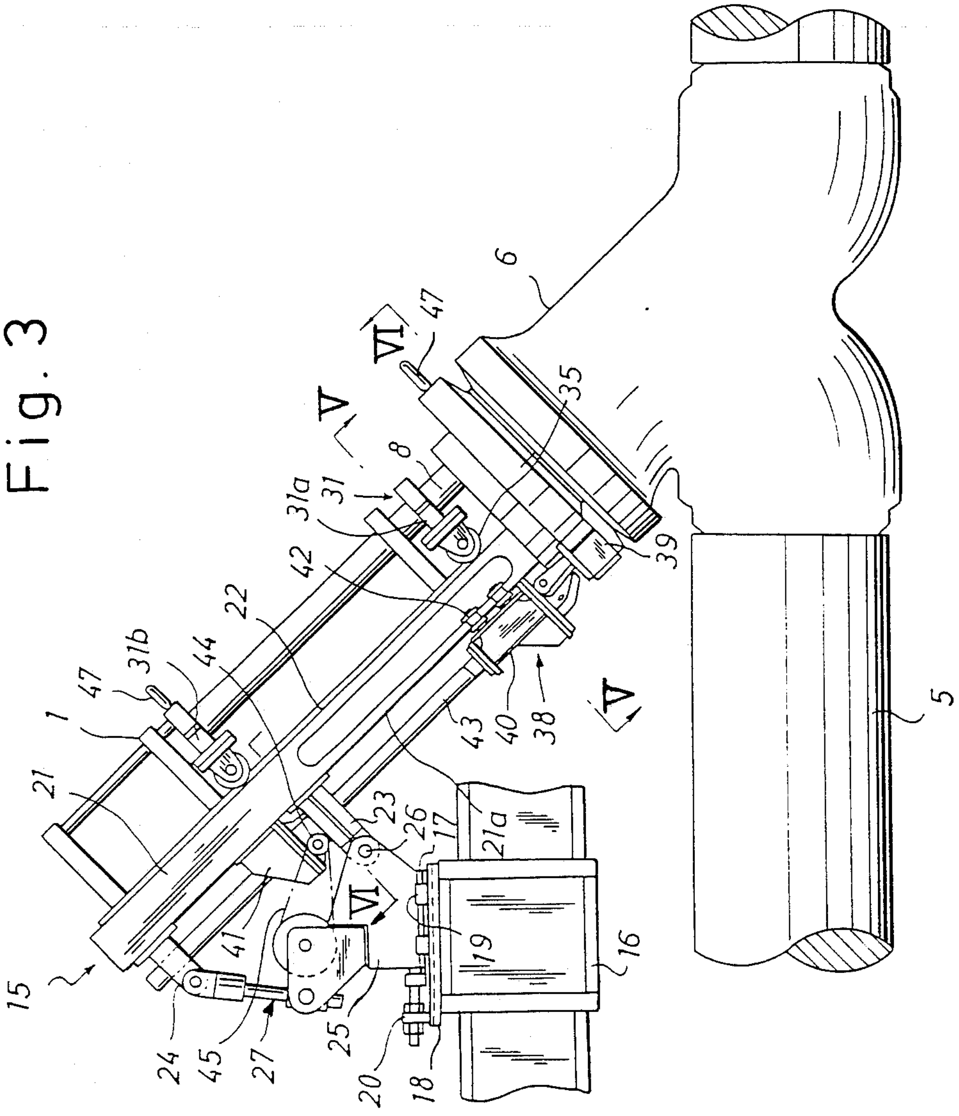
FIG. 3 is a side view of a device in accordance with the present invention.

In order to disassemble and reassemble the isolation valve 1 of the type described, a device generally indicated by 15 as shown in FIG. 3 is used. The device 15 has a supporting stand 17 on a stationary member 16 which is thermally isolated from the isolation valve 1. The supporting stand 17 is adapted to move toward or away from the isolation valve 1. The stand 17 is mounted on a base 18 formed integral with the stationary member 16 and is adapted to move in the direction in parallel with the axis of the main steam pipe 5 along guides 19 on the base 18 (See FIGS. 3 and 4). A jack 20 is mounted on the base 18 in order to displace the supporting stand 17. A pair of guide bars 21 are attached to the supporting stand 17 such that the guide bars 21 can be inclined at a suitable angle. The guide bars 21 serve to guide the isolation valve 1 in its axial direction through a supporting member 31 to be described below. Therefore, the length of the guide bars 21 is so selected that the isolation valve 1 can be pulled out of the branched pipe 6. A rail 22 for guiding the supporting member 31 is laid over the upper surface of each guide bar 21 and is extended in the axial direction thereof (See FIGS. 5 and 6). Each guide bar 21 has supporting legs 23 and 24 formed integral therewith. The center supporting leg 23 is pivoted with a pin 26 to a bracket 25 which in turn is attached to the supporting stand 17. The upper supporting leg 24 is supported by the bracket 25 through a screw-jack-type angle adjusting member 27 so that the angle of inclination of the guide bar 21 can be suitably selected. The angle adjusting member 27 comprises, for example, a screw rod or externally threaded rod 29 at the upper end of which is attached a bracket 28 which in turn pivotably supports the upper supporting leg 24, a trunnion 30 which is pivoted to the bracket 25 and through which the screw rod 29 is passed, and nuts 50. The screw rod 29 is vertically moved by rotating the nuts 50.

Figure 5:
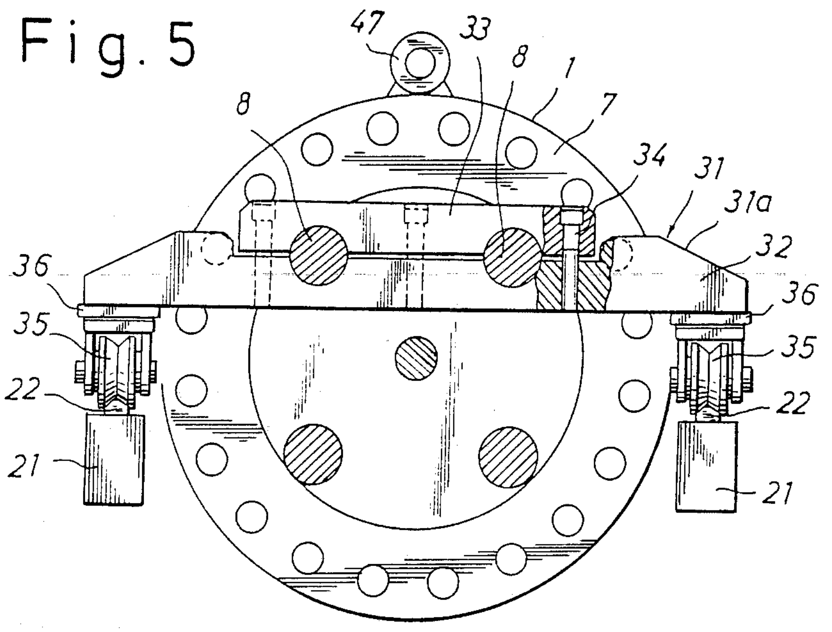
FIG. 5 is a sectional view taken along the line V—V of FIG. 3.

The supporting member 31 supports the isolation valve 1 such that the valve 1 may run along the guide bars 21. The supporting member 31 comprises a front supporting member 31*a* for supporting the flange plate 7 of the isolation valve 1 and a rear supporting member 31*b* for supporting the end plate 9. The front supporting member 31*a* is attached to the yoke rods 8 of the isolation valve 1 while the rear supporting member 31*b* is attached to the end plate 9. That is, as shown in FIG. 5, the front supporting member 31*a* is positioned below the yoke rods 8 at right angles with respect to the latter. The member 31*a* has a front supporting body 32 which is extended radially outwardly of the isolation valve 1 and a clamping plate 33 which is located above the yoke rods 8. The front supporting body 32 and the clamping plate 33 are securely joined to each other with bolts 34. The front supporting body 32 has wheels 35 which ride on the rails 22 on the guide bars 21. Shims 36 are interposed between the wheels 35 and the front supporting body 32 so that the height of the wheels 35 may be adjusted.

Figure 6:
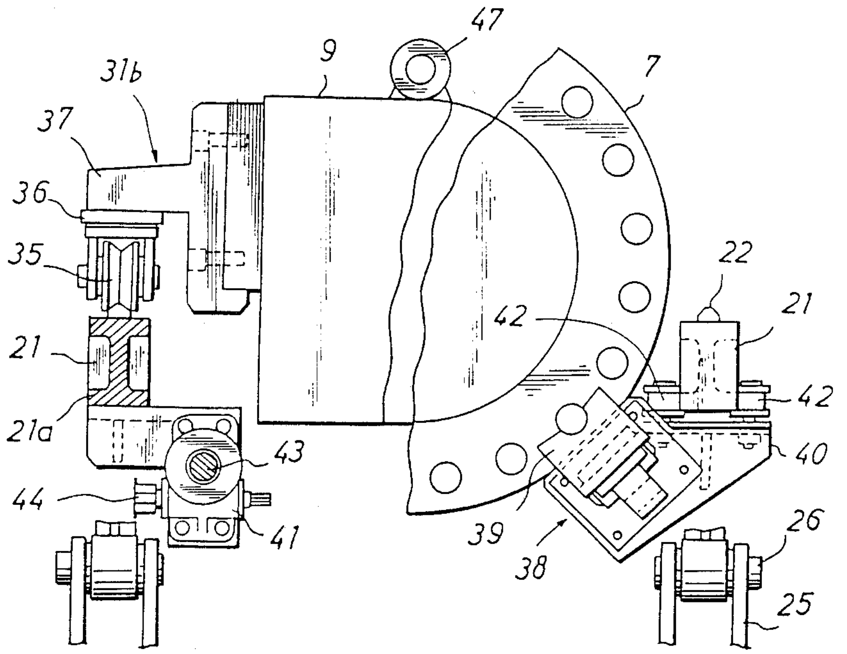
FIG. 6 is a sectional view taken along the line VI—VI of FIG. 3.

The rear supporting member 31*b* has a rear supporting body 37 which is extended horizontally radially outwardly of the end plate 9 and which is joined to the end plate 9 by means of bolts. As shown in FIG. 6, the rear supporting body 37 has a wheel 35 and a shim 36 is interposed between the wheel 35 and the rear supporting body 37.

Figure 7:
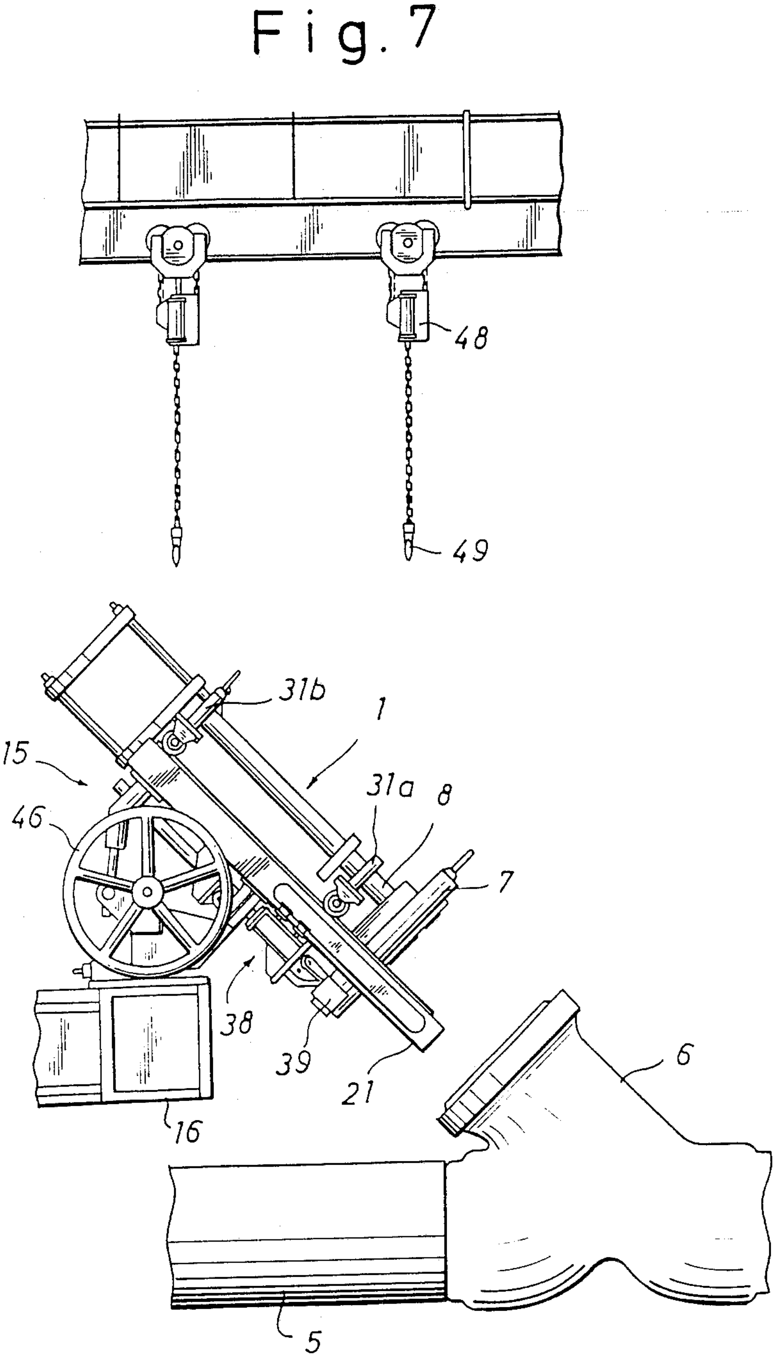
FIG. 7 is a view used to explain the mode of operation of the device in accordance with the present invention.

There is provided a drive means 38 which is adapted to engage with the isolation valve 1 so as to guide it along the guide bars 21. The drive means 38 is provided for each guide bar 21 so as to support the isolation valve 1 at two points. It comprises an engaging pawl 39 adapted to engage with the flange plate 7, a guide 40 for guiding the pawl 39 along the guide bar 21 and a driving unit 41 for moving the guide 40. More particularly, the guide bar 21 is I-shaped in cross section and the lower flange 21*a* serves as a rail for the guide 40. That is, the guide 40 has a wheel 42 which engages with the lower flange 21*a*. The guide 40 has the pawl 39 at one end (lower end) and has its the other end connected to a screw rod 43 of the driving unit 41. The driving unit 41 comprises a worm-gear-type screw jack. The screw rod 43 is extended in parallel with the guide bar 21 and is connected to the rear end of the driving unit 41 (See FIG. 6). Reference numeral 44 designates a sprocket connected to the driving unit 41. The sprocket 44 is connected through a chain 45 to a prime mover or a handlewheel 46 as shown in FIG. 7. The driving unit 41 may comprise a cylinder.

In order to lift the isolation valve 1, the flange plate 7 and the end plate 9 are provided with eyes 47. As shown in FIG. 7, chain blocks 48 are disposed above the main steam isolation valve 1.

Next the mode of operation will be described. Normally the supporting stand 17 is moved away from the main steam isolation valve 1 so that the guide bars 21 are separated from the front and rear supporting members 31*a* and 31*b* and consequently thermatically isolated from the isolation valve 1. As a result, the guide bars 21 are prevented from being adversely affected by heat from the isolation valve 1 which is at high temperature. In order to disassemble the isolation valve 1, the screw jack 20 is operated to advance the supporting stand 17 while the angle adjusting member 27 is so operated that the guide bars 21 become in parallel with the isolation valve 1 and the supporting members 31*a* and 31*b* are engaged with the rails 22 on the guide bars 21. If the angle adjustment of the guide bars 21 is made beforehand, it suffices only to advance the supporting stand. When the rails 22 on the guide bars 21 engage with the wheels 35 of the supporting members 31*a* and 31*b*, the pawls 39 engage with the flange plate 7. Since the flange plate 7 is securely joined to the branched pipe 6 of the main steam pipe 5 with bolts, the bolts are loosened and removed when the isolation valve 1 is disassembled.

Thereafter the driving unit 41 is driven so that the pawls 39 are moved upwardly through screw rods 43 so that the isolation valve 1 is lifted along the guide bars 21 (See FIG. 7). In case of reassembly, the pawls 39 are moved downwardly.

As described above, the isolation valve 1 is withdrawn or inserted along the guide bars 21 which are set in parallel with the axis of the isolation valve 1 so that the disassembly and reassembly of the isolation valve 1 can be accomplished quickly in a simple manner without requiring any skilled worker. Furthermore, the valve stem is positively prevented from being bent. The drive means 38 is mounted on the guide bar 21 so that a minimum installation and working space is required. As a result, even if the isolation valve 1 is installed in a very narrow space, the disassembly and reassembly can be accomplished in a simple manner. In order to move the disassembled isolation valve 1 to another place, hooks 49 of the chain blocks 48 are engaged with the eyes 47 so that the isolation valve 1 may be lifted and moved to a desired place.

In order to apply the present invention to the existing main steam isolation valve, the base 18 is first mounted on the stationary member 16 and then the supporting stand 17 with the guide bars 21 and the drive means 38 is mounted on the base 18. Thereafter the supporting members 31*a* and 31*b* are mounted on the yoke rods 8 of the isolation valve 1. In this case, the front supporting member 31*a* is disposed above the yoke rods 8 so that the device in accordance with the present invention can be installed without modifying the main steam isolation valve 1. As a result, the installation becomes simple and the alignment can be attained in a simple manner. Furthermore the angle of inclination of the guide bars 21 can be arbitarily adjusted so that the device of the present invention may be applied to any main steam isolation valve which is inclined at any angle with respect to the main steam pipe.

The effects, features and advantages of the present invention can be summarized as follows:

(1) The main steam isolation valve can be moved along its axis by means of the guide bars whose angle of inclination can be suitably adjusted and the supporting member which is adapted to move the isolation valve along the guide bars. As a result, the disassembly and reassembly of the isolation valve which requires a high degree of accuracy can be quickly accomplished in a simple manner without the need of skilled workers.

(2) The supporting stand is moved toward or away from the main steam isolation valve so that the guide bars can be thermally isolated from the supporting member on the isolation valve. As a result, the device of the present invention may be normally set at its position even when the nuclear reactor is operating. Therefore the time required for disassembling and reassembling the isolation valve can be reduced to a minimum.

(3) Since the drive means for moving the main steam isolation valve upward or downward is disposed on the guide bar, an installation and working space can be reduced to a minimum.

(4) The operation is simple and the disassembly and reassembly of the main steam isolation valve can be accomplished within a short time period. As a result, the exposure to radiation can be reduced to a minimum so that the safe operation can be ensured.

What is claimed is:

1. A device for disassembling and reassembling a main steam isolation valve of the type in which the isolation valve installed at an angle relative to a main steam pipe extended from a nuclear reactor is withdrawn along an axis of said isolation valve from said main steam pipe and then said isolation valve is reinserted into said main steam pipe, comprising a supporting stand mounted on a stationary member thermatically isolated from said isolation valve and adapted to move toward or away from said isolation valve, guide bars each mounted on said supporting stand such that an angle of inclination of said guide bar can be arbitrarily adjusted, said guide bars being extended in parallel with the axis of said isolation valve, a supporting member mounted on said isolation valve for supporting said isolation valve such that said isolation valve can be freely moved over said guide bars, and drive means mounted on said guide bar and engaged with said isolation valve so as to cause upward or downward movement of said isolation valve along said guide bars.

* * * * *